(No Model.) 2 Sheets—Sheet 1.

I. MacW. BOURKE.
SPRING WHEEL.

No. 541,715. Patented June 25, 1895.

Witnesses:
Jas. E. Hutchinson.
Geo. W. Rea.

Inventor:
Isidore MacWilliam Bourke,
By James L. Norris.
Atty.

(No Model.) 2 Sheets—Sheet 2.

I. MacW. BOURKE.
SPRING WHEEL.

No. 541,715. Patented June 25, 1895.

Witnesses:
Jas. E. Hutchinson
Geo. W. Rea.

Inventor:
Isidore MacWilliam Bourke,
By James L. Norris.
Atty.

THE NORRIS PETERS CO., PHOTO-LITHO., WASHINGTON, D. C.

UNITED STATES PATENT OFFICE.

ISIDORE MAC WILLIAM BOURKE, OF LONDON, ENGLAND.

SPRING-WHEEL.

SPECIFICATION forming part of Letters Patent No. 541,715, dated June 25, 1895.

Application filed November 26, 1894. Serial No. 530,058. (No model.)

*To all whom it may concern:*

Be it known that I, ISIDORE MAC WILLIAM BOURKE, physician, a subject of the Queen of Great Britain, residing at 40 Redcliffe Square, London, England, have invented an Improved Spring Apparatus for Use in Wheels, of which the following is a specification, reference being had to the accompanying drawings.

This invention has for its object the provision of an improved driving connection between the axle or the part of the wheel in contact with the axle (said part being hereinafter termed the axle box) and the hub from which the spokes spring. The said connection is composed of springs and one, two or more compound slides. Each compound slide consists of two slides arranged to slide in directions at right angles to each other, so that the axle box is free to move in any direction in a plane at right angles to the axle, while the axle box and hub must turn together.

The chief feature of my present invention relates to the springs. Those which govern one of the slides of each compound slide are attached at one end to the hub and at the other end to the slide, and those which govern the other slide are attached at one end to the said slide and at the other end to the other slide by which construction the springs have a movement only in the direction of their length, and hence do not become injuriously bent and strained.

Illustrations of my improved apparatus are shown in the accompanying drawings, wherein—

Figure 1:
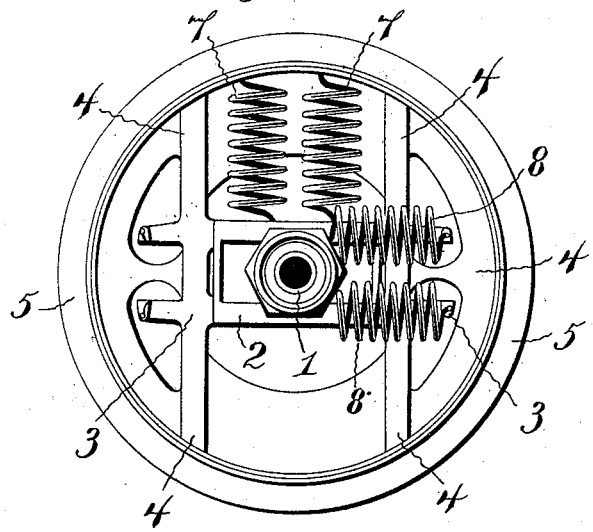
Figure 2:
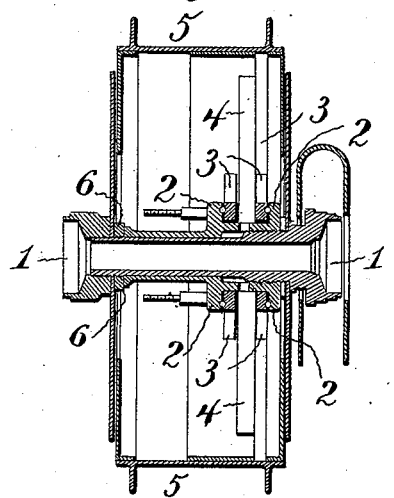
Figure 3:
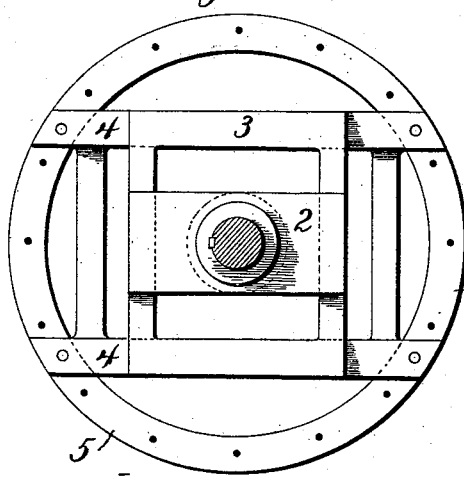
Figure 4:
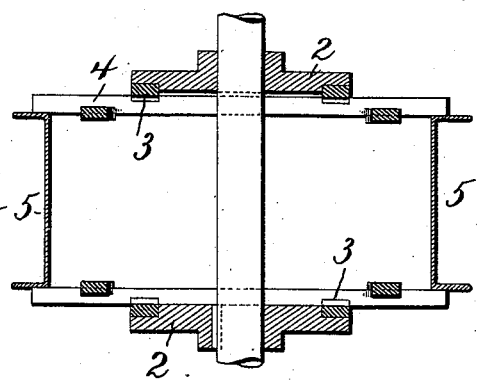
Figure 5:
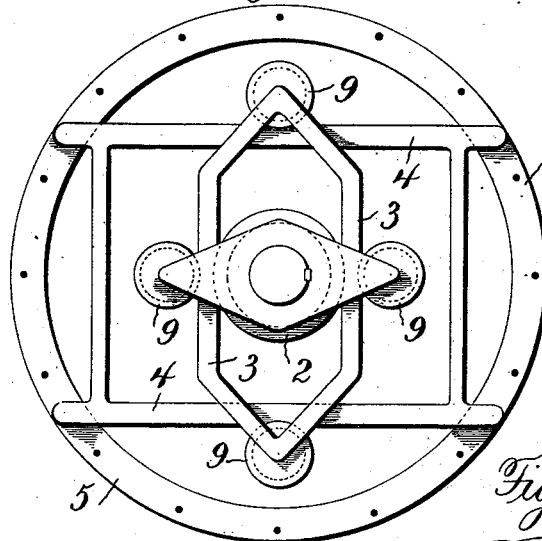
Figure 6:
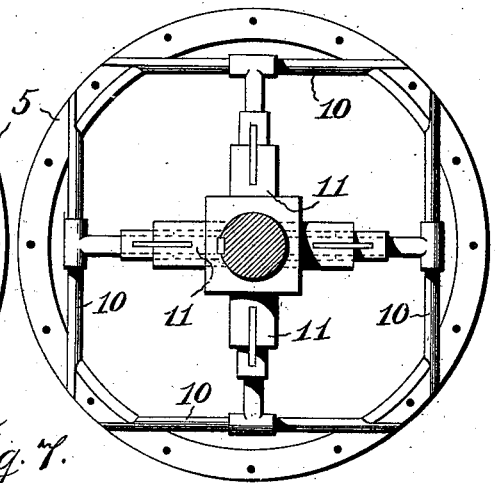
Figure 7:
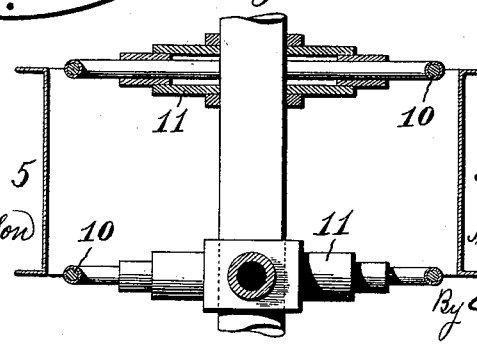

Figure 1 is a side view of a spring-hub suitable for the rear driving-wheel of a bicycle, for example, and showing two pairs of spiral springs in position acting on their respective slides in directions at right angles to each other. The slides will have when complete other springs directly opposed to those shown. Fig. 2 is a section of the said hub. Figs. 3 and 4 are side elevation and section, respectively, of a modified form of hub. Fig. 5 is a side elevation of another modified form of hub; and Figs. 6 and 7 are side elevation and section, respectively, of a still further modified hub. In Figs. 3 to 7 all the springs are removed.

Referring to Figs. 1 and 2, 1 is the axle box forming at its ends the ball races. 2 is a slide fixed to the said axle box and sliding on a frame 3 which constitutes another slide sliding on the cross bars 4 which are secured to the hub. The direction of motion of the slide 3 is perpendicular to that of the slide 2.

5 is a flange to which spokes are attached.

6 is an adjusting nut.

7 are springs attached at one end to the hub and at the other end to the slide 3. 8 are other springs attached at one end to the slide 2 and at the other end to projections extending from the slide 3. When the slide 3 moves along the bars 4 it carries with it not only the slide 2 but also the springs 8 and therefore does not affect the tension of the springs 8. When the slide 2 moves in or on the slide 3 it compresses or extends the springs 8 but does not affect the springs 7. As before stated these springs are duplicated by others on the opposite side of the slides. Each compound slide is thus accompanied by four springs 7 and four springs 8, and each set of springs is at right angles to another set.

It will be observed that the springs 7, which govern the slide 3, are attached at one end to said slide and at the other end to the hub ring 5; while the springs 8, that govern the slide 2, are attached at their opposite ends to the slides 2 and 3, respectively. By this manner of attaching the springs 7 and 8 and arranging them at right angles to each other each set will have a movement only in the direction of its length and, therefore, the springs cannot become injuriously bent or strained.

I provide ball bearings between the slides 2 and 3 and also between the slide 3 and the bars 4. The balls work in grooves and act as driving connections between the slides and the bars 4. The grooves in which the balls work are closed at the ends to maintain the balls in place. In some instances the grooves are divided by stops into two or more spaces each of which contains one, two or more balls. Adjusting screws or their equivalent may be used for adjusting the parts relatively to each other. The slides may have any suitable or convenient form other than that shown. I may provide one, two, or more of such compound slides arranged in any suitable manner with respect to the hub.

Figs. 3 and 4 show a similar arrangement of slides but without ball bearings.

Fig. 5 shows an arrangement where the slides are furnished with rollers 9 in lieu of ball bearings. This arrangement may be described as a double ended lever 2 fixed upon the axle box and provided with two rollers 9, 9 free to roll on the outside of the secondary frame or slide 3, which in turn is furnished with rollers that roll on the outside of the frame 4 attached to the hub. These rollers act as drivers when the axle box is rotated.

Figs. 6 and 7 show a telescopic cruciform arrangement of slides. 10, 10 are bars fixed to the hub. 11, 11 are telescopic rods attached at their inner ends to the axle box and furnished at the outer ends with eyes that slide on the bars 10.

Instead of the four telescopic slides as shown only two may be used in certain cases.

Ball bearings may be used in the portions which slide on the bars 10.

Chains and bars which can bend in one direction only may be substituted for the telescopic arrangement.

The springs 7 and 8 have been omitted from Figs. 3 to 7 only for the sake of clearness in illustrating the modified forms of hub shown in these figures, and I would have it understood that in each modified form of hub the same arrangement of springs 7 and 8 is to be employed as has been hereinbefore described with reference to Figs. 1 and 2.

My improvements are also applicable to those cases where the axle box is dispensed with and the spoke hub is attached directly to the axle.

In Letters Patent No. 510,882, granted to me December 19, 1893, I have shown and claimed the combination with a hub-ring a center portion, or axle, and springs interposed between the said center portion and hub-ring, of a slide secured to the hub-ring, a slide secured to the center portion or axle, and an intermediate slide operatively connecting the two aforesaid slides, in such manner that the hub-ring and center portion are rigidly connected both circumferentially and laterally and are free to move radially with respect to each other. This I do not claim herein.

What I do claim as my invention is—

1. In a wheel, the combination with a hub, a movable axle, and a compound slide comprising several parts or slides adapted to move on each other and connecting said hub and axle, of the sets of springs arranged at right angles to each other, as shown and described, one set of springs being attached at one end to one of the slides and at the other end to a fixed part of the hub and the other set attached at opposite ends to different slides in the same compound slide, whereby torsional straining of the said spring is prevented, substantially as specified.

2. In a wheel, the combination of a hub, an axle supported in a compound slide and free to move in any direction in a plane at right angles to the axle, the said compound slide comprising several parts or slides adapted to move on each other and provided with ball bearings, and the sets of springs arranged at right angles to each other, as shown and described one set of springs being connected at one end to one of the slides and at the other end to a fixed part of the hub, and the other set attached at opposite ends to different slides in the same compound slide, whereby torsional straining of the said springs is prevented, substantially as specified.

In testimony whereof I have hereunto set my hand this 8th day of November, 1894.

ISIDORE MAC WILLIAM BOURKE.

Witnesses:
J. WINLO HOAR,
T. F. BARNES.